(12) United States Patent
Schroeder et al.

(10) Patent No.: US 9,383,217 B2
(45) Date of Patent: Jul. 5, 2016

(54) METHODS AND SYSTEMS FOR DISPLAYING CONTENT SELECTIONS IN VEHICLES

(75) Inventors: Jamison C. Schroeder, Birmingham, MI (US); Charles A. Massoll, Milford, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2211 days.

(21) Appl. No.: 12/207,672

(22) Filed: Sep. 10, 2008

(65) Prior Publication Data
US 2010/0064250 A1 Mar. 11, 2010

(51) Int. Cl.
*G06F 3/048* (2013.01)
*G01C 21/36* (2006.01)
*G06F 3/0485* (2013.01)

(52) U.S. Cl.
CPC .......... *G01C 21/3679* (2013.01); *G06F 3/0485* (2013.01)

(58) Field of Classification Search
USPC ........................................................ 715/784
See application file for complete search history.

(56) References Cited

U.S. PATENT DOCUMENTS

| | | | | |
|---|---|---|---|---|
| 5,889,236 A | * | 3/1999 | Gillespie et al. | 178/18.01 |
| 6,016,110 A | * | 1/2000 | Takinami | 340/995.16 |
| 6,970,871 B1 | * | 11/2005 | Rayburn | |
| 7,065,387 B2 | * | 6/2006 | Engstrom | 455/566 |
| 7,312,785 B2 | | 12/2007 | Tsuk et al. | |
| 2007/0024595 A1 | * | 2/2007 | Baker et al. | 345/173 |
| 2007/0171191 A1 | | 7/2007 | Sohn et al. | |
| 2007/0198476 A1 | | 8/2007 | Farago et al. | |
| 2008/0235583 A1 | * | 9/2008 | Ostergaard | G11B 27/34 386/343 |
| 2009/0063974 A1 | * | 3/2009 | Bull et al. | 715/716 |

OTHER PUBLICATIONS

Kofman, V. "Implementing Dynamic Scroll with Ajax, JavaScript, and XML," Developer.com, Jun. 6, 2007.
Office Action mailed on Apr. 8, 2010 for German Patent Application No. 102009040387, filed Sep. 7, 2009.
Office Action mailed on Jan. 28, 2013 for German Patent Application No. 102009040387.6, filed Sep. 7, 2009.

\* cited by examiner

*Primary Examiner* — William Trapanese
(74) *Attorney, Agent, or Firm* — Ingrassia Fisher & Lorenz, P.C.

(57) ABSTRACT

A method for displaying content items of a navigation system for a vehicle includes the steps of obtaining a scrolling input from a user, determining a value pertaining to the input, and displaying the content items at a first scrolling rate if the value is greater than a predetermined threshold.

20 Claims, 2 Drawing Sheets

METHODS AND SYSTEMS FOR DISPLAYING CONTENT SELECTIONS IN VEHICLES

TECHNICAL FIELD

The present invention generally relates to the field of vehicles and, more specifically, to methods and systems for displaying content lists in vehicles.

BACKGROUND OF THE INVENTION

Many vehicles today include vehicle navigation systems that provide information to the occupants of the vehicle as to a location of the vehicle. Often, the navigation systems also provide content lists with various points of interest or other content that may be of interest to the occupants. For example, such content lists often include lists of nearby restaurants, service stations, hotels, retail stores, or other points of interest.

However, it can be difficult for vehicle occupants to review such content lists while operating the vehicle. In some cases, scrolling through the content lists may be performed at too fast a rate for the user to view and understand the information displayed. In other cases, the content lists may contain too many items for the user to view and understand. Doing so could cause the driver's eyes to be diverted from the vehicle's path. For this reason, many vehicle navigation systems do not permit vehicle occupants to scroll through such content lists while the vehicle is travelling faster than a threshold speed, such as, for example, five miles per hour.

Accordingly, it is desirable to provide an improved method for displaying content lists in vehicles that would provide improved access to the content lists for occupants of the vehicles. It is also desirable to provide an improved program product for such displaying of content lists in vehicles. It is further desired to provide an improved system for such displaying of content lists in vehicles. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for displaying content items of a navigation system for a vehicle is provided. The method comprises the steps of obtaining a scrolling input from a user, determining a value pertaining to the scrolling input, and displaying the content items at a first scrolling rate if the value is greater than a predetermined threshold.

In accordance with another exemplary embodiment of the present invention, a program product for displaying content items of a navigation system for a vehicle is provided. The program product comprises a program and a computer-readable signal-bearing media. The program is configured to at least facilitate obtaining a scrolling input from a user, determining a value pertaining to the scrolling input, and displaying the content items at a first scrolling rate if the value is greater than a predetermined threshold. The computer-readable signal-bearing media bears the program.

In accordance with a further exemplary embodiment of the present invention, a system for displaying content items for a user of a vehicle is provided. The system comprises an input device, a processor, and a display. The input device is configured to at least facilitate obtaining a scrolling input from the user. The processor is coupled to the input device, and is configured to at least facilitate determining a value pertaining to the scrolling input. The display is coupled to the processor, and is configured to at least facilitate displaying the content items at a first scrolling rate if the value is greater than a predetermined threshold.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
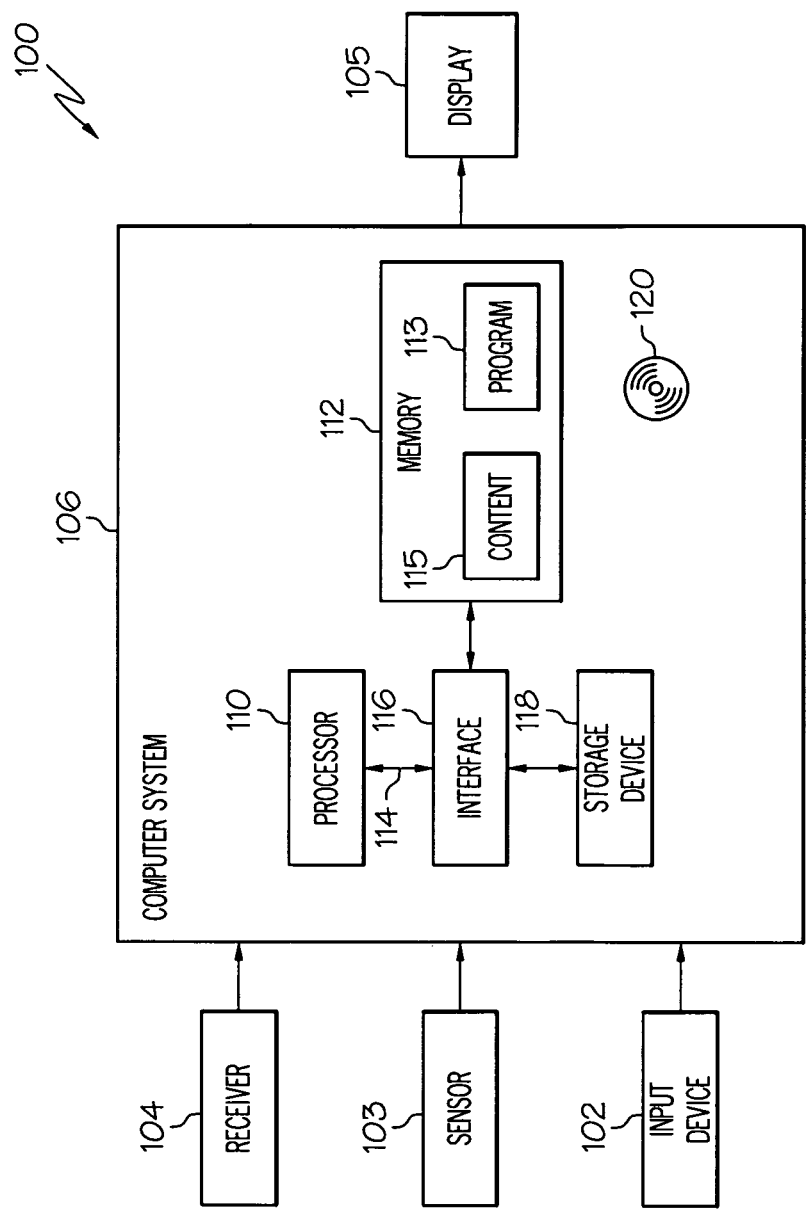
FIG. 1 is a functional block diagram of a control system for displaying content lists in vehicles, in accordance with an exemplary embodiment of the present invention.

FIG. 1 is a functional block diagram of a control system 100 for displaying content lists in vehicles, in accordance with an exemplary embodiment of the present invention. In a preferred embodiment, the control system 100 comprises a vehicle navigation system for a vehicle. In certain other preferred embodiments, the control system 100 or portions thereof are used in conjunction with a vehicle navigation system for the vehicle. Also in certain preferred embodiments, the vehicle comprises an automobile such as a sedan, a truck, a van, a sport utility vehicle, or another type of automobile. However, in various embodiments, the control system 100 can be used in connection with any number of types of vehicles and/or systems thereof.

As shown in FIG. 1, the control system 100 comprises an input device 102, a sensor 103, a receiver 104, a computer system 106, and a display 105. The input device 102 is configured to at least facilitate obtaining one or more inputs from a user. In a preferred embodiment, the inputs include preferences as to which points of interest or other content items the user wishes to have displayed, how the user would like the content items sorted into one or more content lists, and how the user would like content lists (for example, lists of content items such as restaurants, hotels, service stations, retail stores, or other points of interest to the user) to be displayed on the display 105.

In one preferred embodiment, the input device 102 includes a button that the user can apply force against to provide the user's input. In another preferred embodiment, the input device 102 includes a rotary knob that the user can turn to provide the user's input. In certain embodiments, the input device 102 may include multiple buttons, multiple rotary knobs, and/or other input devices such as, for example, an interactive screen that may be part of or implemented in connection with the display 105 In yet other embodiments, the input device 102 comprises one or more various other different types of devices, such as capacity panels, touch panels, swipe operations, and/or one or more of any number of different other types of devices.

The sensor 103 is coupled between the input device 102 and the computer system 106. In a preferred embodiment, the sensor 103 is configured to at least facilitate detecting an engagement or application of the input device by the user, generating an input signal pertaining thereto, and providing the input signal to the computer system 106. For example, in one preferred embodiment in which the input device 102 includes a button, the sensor 103 detects a force applied by the user in engaging the button, a movement or an accelerated pushing of the button, an amount of time during which the user is applying force against the button, and/or one or more other measures relating to the user's engagement of the button. In another exemplary embodiment in which the input device 102 includes a rotary knob, the sensor 103 detects a torque applied by the user in engaging the rotary knob, a clockwise or counterclockwise movement or acceleration of the rotary knob, a pushing of the knob, an amount of time during which the user is moving, holding, or otherwise engaging the rotary knob, and/or one or more other measures relating to the user's engagement of the rotary knob. It will appreciated that any one or more of a number of different types of sensors 103 and/or similar devices may be used in connection with any one or more of a number of different types of corresponding input devices 102.

The receiver 104 is coupled to the computer system 106. In a preferred embodiment, the receiver 104 is configured to at least facilitate obtaining a position signal representing a position of the vehicle. In a preferred embodiment, the receiver 104 receives the position signal from one or more satellites (not depicted in FIG. 1) as part of a global positioning system. Also in a preferred embodiment, the receiver 104 provides the position signal to the computer system 106 for processing and ultimately for use in determining an optimal display of and/or type of scrolling through one or more content lists on the display 105.

The computer system 106 is coupled between the input device 102, the sensor 103, the receiver 104, and the display 105. In a preferred embodiment, the computer system 106 is configured to at least facilitate determining a value pertaining to the input (preferably a measure of engagement of the input device 102 by the user, such as a movement of the input device 102 or an acceleration thereof, an amount of time during which the input device 102 is engaged, and/or a force applied to the input device 102 by the application thereof) based at least in part on the value pertaining to the input. Also in a preferred embodiment, the computer system 106 is configured to sort various content items stored therein into an order based at least in part on the position signal and the input signal. The order is preferably based on one or more sorting criteria for the content list, such as a distance between content items and the vehicle, a first letter or number of the different content items, expected costs associated with the content items (for example, average dinner prices for different restaurants or average room rates for different hotels), rankings of the content items (for example, a number stars or diamonds awarded by consumer ranking organizations accorded to different restaurants, hotels, or other points of interest), and/or various other possible sorting criteria. In addition, the computer system 106 is preferably configured to provide instructions to the display 105 for displaying and scrolling through the ordered lists on the display 105 in accordance with the user's desires as expressed through the user input.

In the embodiment depicted in FIG. 1, the computer system 106 includes a processor 110, a memory 112, a computer bus 114, an interface 116, and a storage device 118. The processor 110 performs the computation and control functions of the computer system 106 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 110 executes one or more programs 113 preferably stored within the memory 112 and, as such, controls the general operation of the computer system 106.

In a preferred embodiment, the processor 110 receives the input signal from the sensor 103 and the position signal from the receiver 104, processes these signals, determines a value pertaining to the input (preferably a measure of engagement of the input device 102 by the user, such as a movement of the input device 102 or an acceleration thereof, an amount of time during which the input device 102 is engaged, and/or a force applied to the input device by the application thereof) based at least in part on the input signal, sorts various content items stored therein into an ordered selection based at least in part on the input signal, and provides instructions to the display 105 for displaying and scrolling through the ordered selection on the display 105 in accordance with the user's desires as expressed through the user input. In so doing, the processor 110 preferably executes the one or more programs 113 stored in the memory 112.

In executing these steps, the processor 110 preferably also utilizes content 115 that is also stored in the memory 112. In a preferred embodiment, the content 115 comprises a database of content items. Also in a preferred embodiment, the content 115 includes information regarding the above-referenced content items. The content 115 preferably includes content items that include points of interest for the occupants along with data (e.g., a location or description) pertaining thereto. For example, in one preferred embodiment, the content 115 includes data pertaining to service stations, hotels, attractions, and other points of interest.

As referenced above, the memory 112 stores a program or programs 113 that execute one or more embodiments of processes such as the process 200 described below in connection with FIG. 2 and/or various steps thereof and/or other processes, such as those described elsewhere herein. In addition, as referenced above, the memory 112 also stores the content 115 that preferably includes various points of interest for the occupants of the vehicle and geographic and other data pertaining thereto.

The memory 112 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 112 may be a single type of memory component, or it may be composed of many different types of memory components. In addition, the memory 112 and the processor 110 may be distributed across several different computers that collectively comprise the computer system 106. For example, a portion of the memory 112 may reside on a computer within a particular apparatus or process, and another portion may reside on a remote computer.

The computer bus 114 serves to transmit programs, data, status and other information or signals between the various components of the computer system 106. The computer bus 114 can be any suitable physical or logical means of connecting computer systems and components. This includes, but is not limited to, direct hard-wired connections, fiber optics, infrared and wireless bus technologies.

The interface 116 allows communication to the computer system 106, for example from a vehicle occupant, a system operator, and/or another computer system, and can be implemented using any suitable method and apparatus. In certain embodiments, the interface 116 receives input from an occupant of the vehicle, preferably via the input device 102 of FIG. 1.

The storage device 118 can be any suitable type of storage apparatus, including direct access storage devices such as hard disk drives, flash systems, floppy disk drives and optical disk drives. In one exemplary embodiment, the storage device 118 is a program product from which memory 112 can receive a program 113 that executes one or more embodiments of the process 200 of FIG. 2 and/or steps thereof as described in greater detail further below. In one preferred embodiment, such a program product can be implemented as part of, inserted into, or otherwise coupled to the control system 100. As shown in FIG. 1, the storage device 118 can comprise a disk drive device that uses disks 120 to store data. As one exemplary implementation, the computer system 106 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 120), and transmission media such as digital and analog communication links. It will similarly be appreciated that the computer system 106 may also otherwise differ from the embodiment depicted in FIG. 1, for example in that the computer system 106 may be coupled to or may otherwise utilize one or more remote computer systems and/or other control systems.

The display 105 is coupled to the computer system 106. In a preferred embodiment, the display 105 comprises a display screen that is visible to occupants of the vehicle. The display is configured to display the content items and to scroll through the above-reference content items and lists thereof based on instructions provided by the processor 110, which are in turn based upon the above-referenced input provided by the user via the input device 102. In a preferred embodiment, the display 105 is configured to at least facilitate initially displaying a first content item of an ordered selection of content items, and to display additional content items of the ordered selection based upon input provided by the user.

Figure 2:
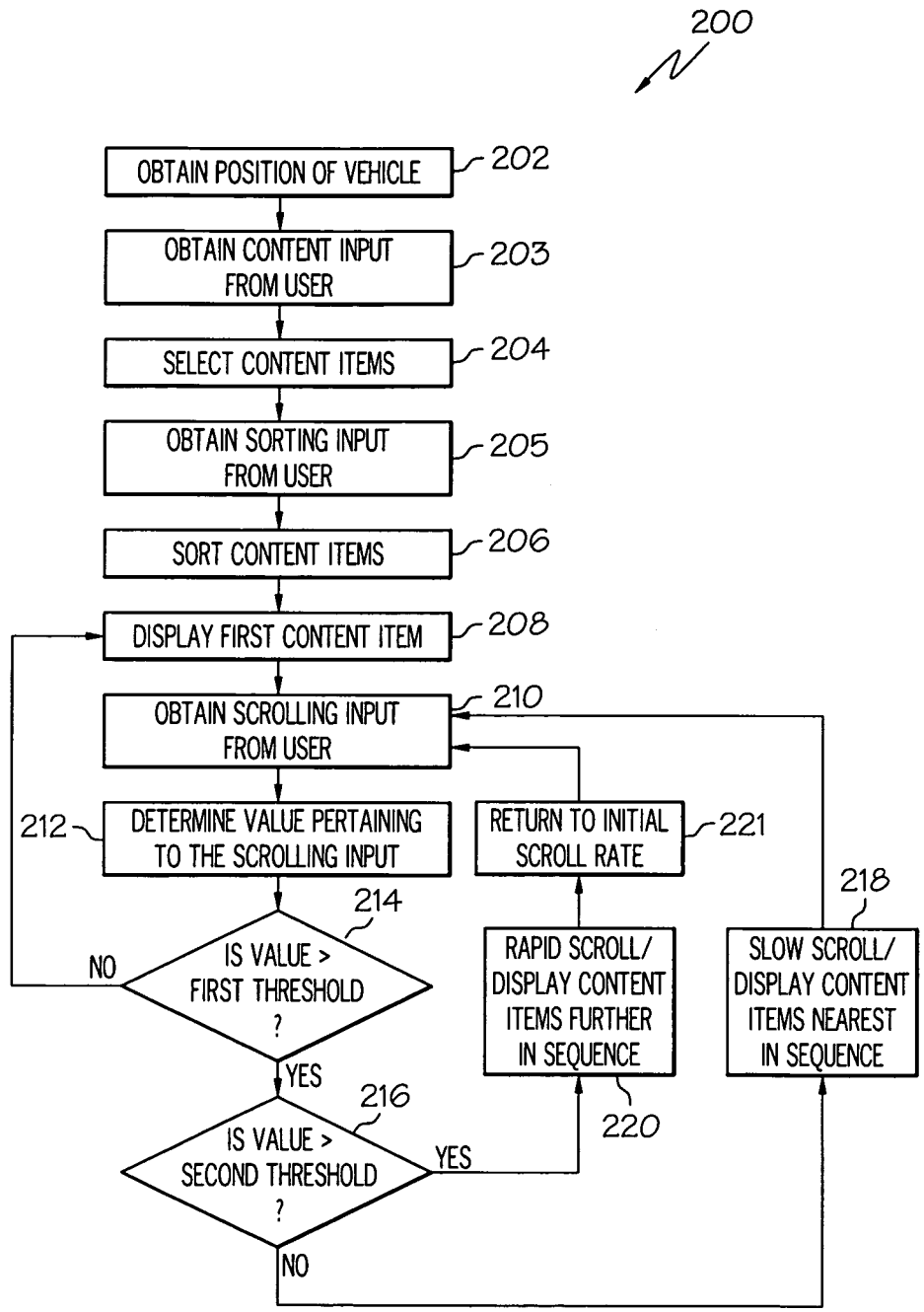
FIG. 2 is a flowchart of a process for displaying content lists in vehicles, and that can be implemented in connection with the control system of FIG. 1, in accordance with an exemplary embodiment of the present invention.

FIG. 2 is a flowchart of a process 200 for displaying ordered selections of content items in a vehicle, in accordance with an exemplary embodiment of the present invention. In a preferred embodiment, the process 200 can be implemented in connection with the control system 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the step of obtaining a position of the vehicle (step 202). In a preferred embodiment, the position of the vehicle is obtained by the receiver 104 of FIG. 1, most preferably via satellite signals provided by one or more satellites coupled thereto as part of a global positioning system. Also in a preferred embodiment, the receiver 104 provides a position signal indicative of the position of the vehicle to the processor 110 of the computer system 106 of FIG. 1 for processing.

In addition, a first input (referenced herein as a content input) is obtained from a user of a vehicle as to one or more types of content items that the user desires to be displayed (step 203). As mentioned above in connection with FIG. 1, the content items preferably include points of interest for occupants of the vehicle. For example, in one preferred embodiment, the content items represent service stations, hotels, attractions, and/or other points of interest. Also in a preferred embodiment, the content input is obtained from a driver or other occupant of the vehicle via the input device 102 of FIG. 1. The content input is preferably detected by the sensor 103 of FIG. 1 and communicated to the processor 110 of FIG. 1 via a content input signal.

Content items then are selected (step 204). In a preferred embodiment, the content items are selected by the processor 110 of FIG. 1 from the content 115 stored in the memory 112 of FIG. 1, based at least in part on the content input provided by the user and on the position signal obtained from the receiver 104 of FIG. 1. For example, if the content input indicates that the user desires to have names and locations of nearby restaurants presented, then the content items selected in step 204 preferably include names and locations of such nearby restaurants from the memory 112 of FIG. 1. In one embodiment, the nearby content items are those content items from the content 115 stored in the memory 112 of FIG. 1 that are less than a predetermined distance from the current position of the vehicle.

A second input (referenced herein as a sorting input) is obtained from the user as to a preferred criterion for sorting the selected content items (step 205). For example, the user may desire to have the selected content items sorted in alphabetical order, by a distance from the position of the vehicle, by a cost or ranking associated with each content item, and/or by one or more other sorting criteria. The sorting input is preferably detected by the sensor 103 of FIG. 1 and communicated to the processor 110 of FIG. 1 via a sorting input signal.

The selected content items are sorted into an ordered selection based at least in part on the sorting input (step 206). In a preferred embodiment, the content items are sorted into an order by the processor 110 of FIG. 1 based on the position signal obtained in step 202 and the sorting input. The processor 110 of FIG. 1 preferably sorts the selected items by sorting criteria represented by the sorting input. The sorting criteria may include a distance between content items and the vehicle, a first letter or number of the different content items, expected costs associated with the content items (for example, average dinner prices for different restaurants, hotels, or other points of interest), rankings of the content items (for example, a number stars or diamonds awarded by consumer ranking organizations accorded to different restaurants, hotels, or other points of interest), and/or various other possible sorting criteria.

The process 200 continues with the display of a first content item from the ordered selection (step 208). In a preferred embodiment, the first content item is displayed on the display 105 of FIG. 1 for the occupants of the vehicle based upon instructions provided by the processor 110 of FIG. 1. For example, in one exemplary embodiment, the displayed first content item comprises a nearest hotel, restaurant, or other point of interest to the vehicle of the ordered selection. In another exemplary embodiment, the first content item represents a first hotel, restaurant, or other point of interest in an alphabetized ordered selection. In yet another exemplary embodiment, the first content item represents a first hotel, restaurant, or other point of interest in an ordered selection that is ordered by cost (for example, a most expensive point of interest may be listed and displayed before less expensive points of interest, or vice versa). In another exemplary embodiment, the first content item represents a first hotel, restaurant, or other point of interest in an ordered selection that is ordered by ranking (for example, a four star point of interest may be listed and displayed before one star points of interest, or vice versa).

In addition, a third input (referenced herein as a scrolling input) is obtained from the user (step 210). In a preferred embodiment, the scrolling input includes preferences of the user as to how the user wishes the content items of the ordered selection to be displayed on the display 105 and/or how the user wishes for the display 105 to scroll through the content list. Also in a preferred embodiment, the scrolling input is obtained from the user via the input device 102 of FIG. 1 which, as described above, preferably includes a button that the user can apply force against and/or a rotary knob that the user can turn in providing the user's input, among other possible input devices 102.

A value pertaining to the scrolling input also is determined (step 212). In one exemplary embodiment in which the input device 102 of FIG. 1 comprises a button, the value pertaining to the scrolling input comprises a value assigned to a force applied by the user in engaging the button, a movement of or an acceleration of pushes to the button, an amount of time during which the user is applying force against the button, and/or one or more other measures relating to the user's engagement of the button. In another exemplary embodiment in which the input device 102 of FIG. 1 includes a rotary knob, the value pertaining to the scrolling input is a variable assigned to a clockwise or counterclockwise movement or acceleration of the rotary knob, an amount of time during which the user is moving, holding, or otherwise engaging the rotary knob, and/or one or more other measures relating to the user's engagement of the rotary knob. In a preferred embodiment, the value pertaining to the scrolling input is determined by the processor 110 of FIG. 1 based on one or more scrolling input signals obtained from the sensor 103 of FIG. 1.

A determination is made as to whether the value pertaining to the scrolling input signal is greater than a first predetermined threshold value (step 214). In a preferred embodiment, this determination is made by the processor 110 of FIG. 1. If it is determined that the value pertaining to the scrolling input signal is less than or equal to the first predetermined threshold value, then the process returns to step 208, and the first content item of the ordered selection continues to be displayed.

If it is determined that the value pertaining to the scrolling input signal is greater than the first predetermined threshold value, then an additional determination is made as to whether the value pertaining to the scrolling input signal is greater than a second predetermined threshold value (step 216). In a preferred embodiment, this determination is also made by the processor 110 of FIG. 1.

If it is determined that the value pertaining to the scrolling input signal is less than or equal to the second predetermined threshold value, then scrolling is conducted through the ordered selection at a first rate (step 218). In one preferred embodiment, additional selected content items of the ordered selection are displayed one additional selected content item at a time in immediate sequence after the first content item in step 218. In accordance with one exemplary embodiment, the first rate of scrolling in step 218 comprises a display of one content item per second. However, this may vary in other embodiments.

In one exemplary embodiment, if the selected content items are sorted by a distance to the vehicle, the additional selected content items displayed in step 218 are preferably those content items representing points of interest that are in immediate sequence with the point of interest represented by the first content item as sorted by distance from the vehicle. In addition, in this exemplary embodiment, the additional selected content items are preferably displayed in order of increasing distance from the position of the vehicle. In another exemplary embodiment in which the selected content items are sorted alphabetically, if the first content item represents a point of interest beginning with the letter "A", the additional selected content items displayed in step 218 are content items of the ordered selection representing points of interest that also begin with the letter "A", and that immediately follow, in alphabetical order, the point of interest represented by the first content item. In yet another exemplary embodiment in which the selected content items are sorted by associated costs of the points of interest represented thereby, the additional selected content items displayed in step 218 are content items representing points of interest that have associated costs that are higher or lower than the associated cost of the point of interest represented by first content item. In still another exemplary embodiment in which the selected content items are sorted by rankings of the represented points of interest, the additional selected content items displayed in step 218 are selected content items representing points of interest that have rankings that are higher or lower in ranking than the ranking of the point of interest represented by the first content item, and most preferably that have rankings that are next in order to the ranking of the point of interest represented by the first content item. The additional selected content items are preferably displayed for the occupants of the vehicle in scrolling fashion at the first rate via the display 105 of FIG. 1.

In a preferred embodiment, the process then returns to step 210, as additional scrolling input is obtained from the user, and the steps following step 210 repeat. In a preferred embodiment, the process also reverts back to step 210 whenever the user significantly changes the scrolling input, for example by altering a torque, force, or application against the input device 102 of FIG. 1, and/or if the user otherwise indicates a preference as to the scrolling rate of the display of the content items.

If it is determined that the value pertaining to the scrolling input signal is greater than the second predetermined threshold value, then scrolling is conducted through the ordered selection at a second rate that is faster than the above-mentioned first rate (step 220). In one preferred embodiment, additional selected content items are displayed one at a time in sequence after the first content item at the second rate. In accordance with one exemplary embodiment, the second rate for scrolling in step 220 comprises a display of five content items per second. However, this may vary in other embodiments.

In another preferred embodiment, additional selected content items are displayed that are not immediately in sequence with the first content item, but rather that are arbitrarily or periodically removed from the first content item of the ordered selection. For example, in this embodiment, various additional selected content items (referenced herein as second additional content items) that are in immediate sequence with the first content item may be skipped in order to display other additional selected content items (referenced herein as third additional content items) that are further in sequence of the ordered selection. For example, in one such embodiment, the display skips to the next section or block in the content list (e.g. skipping to content items starting with a different letter, or that are a different distance from the vehicle, or that have a different ranking or category, etc.).

In various embodiments, the displayed third additional content items may be those that are an arbitrary number from the first content item or those that are in a periodic sequence from the first content items (such as every fifth item displayed). However, this may vary in other embodiments. In yet another exemplary embodiment, multiple selected content items are displayed at the same time in step 220.

In one exemplary embodiment in which the selected content items are points of interest sorted by a distance to the vehicle, if the first selected content item represents a nearest point of interest to the vehicle, then the additional selected content items displayed in step 220 are those selected content items representing points of interest that are a predetermined distance farther from the vehicle than is the point of interest represented by the first content item (for example, that are at least a mile away, in one preferred embodiment). Thus, those selected content items within a mile of the vehicle are not displayed, in this exemplary embodiment. In another exemplary embodiment in which the selected content items are sorted alphabetically, if the first content item represents a point of interest beginning with the letter "A", the additional selected content items displayed in step 220 are content items representing points of interest that begin with a letter in the alphabet subsequent to that of the previously displayed content item. In another exemplary embodiment in which the selected content items are sorted by associated cost, the additional selected content items displayed in step 220 are selected content items representing points of interest that are in a different cost range category than the point of interest represented by the first content item. In yet another exemplary embodiment in which the selected content items are sorted by rankings of the associated points of interest, the additional selected content items displayed in step 220 are content items representing points of interest that have rankings that are different from the ranking of the point of interest represented by the first content item (for example, having more or fewer ranking stars or diamonds). The additional content items are displayed for the occupants of the vehicle in scrolling fashion at the second rate via the display 105 of FIG. 1.

In a preferred embodiment, after a predetermined amount of time of applying the faster scrolling rate of step 220 or after some other criteria is satisfied (e.g. relating to the scrolling input provided by the user, a distance traveled by the vehicle, and/or one or more other criteria), the display and scrolling return to an original or slower scrolling rate (step 221). Most preferably, the scrolling rate of the above-referenced step 218 is used in step 221. The process then returns to step 210, as additional scrolling input is obtained from the user, and the steps following step 210 repeat. The user is thereby allowed to continue to have the slower scrolling rate, if so desired, through the additional scrolling input. Alternatively, the user is also thereby allowed to recommence the rapid scrolling rate, if so desired, through the additional scrolling input. Also, as mentioned above, in a preferred embodiment, the process also reverts back to step 210 whenever the user significantly changes the scrolling input, for example by altering a torque, force, or application against the input device 102 of FIG. 1, and/or if the user otherwise indicates a preference as to the scrolling rate of the display of the content items.

It will be appreciated that certain steps of the process 200 may be unnecessary and/or may vary from those depicted in FIG. 2 and described above. It will similarly be appreciated that various steps of the process 200 may occur simultaneously or in an order that is otherwise different from that depicted in FIG. 2 and/or described above. For example, step 210 can occur before step 206. As another example, the selection or sorting of the content items may use embedded criteria, that is, the user may use multiple sorting criteria. For example, the user may select restaurants and then have them ordered by distance and then by cost. Other variations may also be implemented.

Accordingly, improved methods, program products, and systems are provided for displaying content lists in a vehicle. The improved methods, program products, and systems provide occupants in the vehicle with improved access to content lists, for example in a navigation system of the vehicle, and allow the occupants of the vehicle to easily find and scroll through various content lists in a useful and easy fashion.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for displaying content items of a navigation system for a vehicle, the method comprising the steps of:
   obtaining a scrolling input from a user;
   determining a value pertaining to the input;
   displaying the content items at a first scrolling rate if the value is greater than a first predetermined threshold and less than a second predetermined threshold;
   displaying the content items at a second scrolling rate, greater than the first scrolling rate, for a predetermined amount of time if the value is greater than the first predetermined threshold and also greater than the second predetermined threshold; and
   automatically displaying the content items at the first scrolling rate after the content items are displayed at the second scrolling rate for the predetermined amount of time.

2. The method of claim 1, wherein the value pertaining to the input comprise an amount of force applied by the user to an input device of the navigation system.

3. The method of claim 1, further comprising the steps of:
   obtaining a sorting input from the user;
   obtaining a position of the vehicle;
   sorting the content items into an ordered selection based at least in part on the sorting input and the position of the vehicle; and
   displaying a first content item of the ordered selection.

4. The method of claim 3, further comprising the steps of:
   displaying a second content item of the ordered selection if the value is greater than a second predetermined threshold and less than the first predetermined threshold, the second content item being in sequence with the first content item of the ordered selection; and displaying a third content item of the ordered selection if the value is greater than the first predetermined threshold, the third content item being separated from the first content item by a plurality of additional content items of the ordered selection.

5. The method of claim 1, wherein:
the step of obtaining the scrolling input comprises the step of obtaining the scrolling input via a movement of an input device; and
the step of determining the value comprises the step of determining an acceleration of the movement of the input device.

6. The method of claim 1, wherein:
the step of obtaining the scrolling input comprises the step of obtaining the scrolling input via an engagement of an input device; and
the step of determining the value comprises the step of determining an amount of time during which the input device is engaged.

7. The method of claim 1, wherein:
the step of obtaining the scrolling input comprises the step of obtaining the scrolling input from the user via an application of an input device; and
the step of determining the value comprises the step of determining a force applied to the input device by the application thereof.

8. A system for displaying content items for a user of a vehicle, the system comprising:
an input device configured to at least facilitate obtaining a scrolling input from the user;
a processor coupled to the input device and configured to at least facilitate determining a value pertaining to the input; and
a display coupled to the processor and configured to at least facilitate, based on instructions provided by the processor:
displaying the content items at a first scrolling rate if the value is greater than a first predetermined threshold and less than a second predetermined threshold;
displaying the content items at a second scrolling rate, greater than the first scrolling rate, for a predetermined amount of time if the value is greater than the first predetermined threshold and also greater than the second predetermined threshold; and
automatically displaying the content items at the first scrolling rate after the content items are displayed at the second scrolling rate for the predetermined amount of time.

9. The system of claim 8, wherein the value pertaining to the input comprise an amount of force applied by the user to the input device.

10. The system of claim 8, further comprising:
a receiver configured to at least facilitate obtaining a signal representing a position of the vehicle;
wherein:
the processor is coupled to the receiver and configured to at least facilitate sorting the content items into an ordered selection based at least in part on the signal; and
the display is further configured to at least facilitate:
displaying a first content item of the ordered selection;
displaying a second content item of the ordered selection if the value is greater than the first predetermined threshold and less than the second predetermined threshold, the second content item being in sequence with the first content item of the ordered selection; and
displaying a third content item of the ordered selection if the value is greater than the second predetermined threshold, the third content item being separated from the first content item by a plurality of additional content items of the ordered selection.

11. The system of claim 8, further comprising:
a sensor configured to at least facilitate detecting a movement of the input device and generating a signal pertaining thereto;
wherein:
the processor is coupled to the sensor and further configured to at least facilitate determining an acceleration of the movement based at least in part on the signal; and
the display is further configured to at least facilitate displaying the content items at a first scrolling rate if the acceleration is greater than a predetermined acceleration threshold.

12. The system of claim 8, further comprising:
a sensor configured to at least facilitate detecting an engagement of the input device and generating a signal pertaining thereto;
wherein:
the processor is coupled to the sensor and further configured to at least facilitate determining an amount of time during which the input device is engaged based at least in part on the signal; and
the display is further configured to at least facilitate displaying the content items at a first scrolling rate if the amount of time is greater than a predetermined time threshold.

13. The system of claim 8, further comprising:
a sensor configured to at least facilitate detecting an application of the input device and generating a signal pertaining thereto;
wherein:
the processor is coupled to the sensor and further configured to at least facilitate determining a force applied to the input device by the application thereof; and
the display is further configured to at least facilitate displaying the content items at a first scrolling rate if the force is greater than a predetermined force time threshold.

14. A method for displaying content items of a navigation system for a vehicle, the method comprising the steps of:
obtaining a scrolling input from a user with respect to an input device of the navigation system;
determining a value pertaining to the input;
if the value is greater than a first predetermined threshold and less than a second predetermined threshold, displaying the content items at a first scrolling rate; and
if the value is greater than the first predetermined threshold and also greater than the second predetermined threshold:
initially, displaying the content items at a second scrolling rate, greater than the first scrolling rate, for a predetermined amount of time; and
subsequently, automatically displaying the content items at the first scrolling rate after the content items are displayed at the second scrolling rate for the predetermined amount of time.

15. The method of claim 14, further comprising the step of:
displaying a single content item without scrolling, if the value is less than the first predetermined threshold.

16. The method of claim 14, wherein the value pertaining to the input comprises an amount of force applied by the user to the input device.

17. The method of claim 14, wherein the value pertaining to the input comprises an amount of time is which the user has engaged the input device.

18. The method of claim 14, wherein the value pertaining to the input comprises an acceleration of movement of the input device resulting from engagement of the input device by the user.

19. The method of claim 14, further comprising:
   obtaining a sorting input from the user;
   obtaining a position of the vehicle; and
   sorting the content items into an ordered selection based at least in part on the sorting input and the position of the vehicle;
   wherein the step of displaying the content items at the first scrolling rate comprises displaying the content items in direct sequence; and
   wherein the step of displaying the content items at the second scrolling rate comprises displaying certain of the content items that are not in direct sequence while skipping other intermediary content items from the direct sequence.

20. The method of claim 14, wherein the first scrolling rate comprises an original scrolling rate.

* * * * *